United States Patent
Moore et al.

(10) Patent No.: US 10,317,867 B2
(45) Date of Patent: Jun. 11, 2019

(54) THERMOSTAT UPDATE AND COPY METHODS AND SYSTEMS

(71) Applicant: Braeburn Systems LLC, Montgomery, IL (US)

(72) Inventors: Glenn A. Moore, Geneva, IL (US); Daniel S. Poplawski, Oswego, IL (US)

(73) Assignee: Braeburn Systems LLC, Montgomery, IL (US)

(*) Notice: Subject to any disclaimer, the term of this patent is extended or adjusted under 35 U.S.C. 154(b) by 44 days.

(21) Appl. No.: 15/439,591

(22) Filed: Feb. 22, 2017

(65) Prior Publication Data

US 2017/0300025 A1    Oct. 19, 2017

Related U.S. Application Data

(60) Provisional application No. 62/300,539, filed on Feb. 26, 2016.

(51) Int. Cl.
| | | |
|---|---|---|
| *F24F 11/00* | (2018.01) | |
| *G05B 19/042* | (2006.01) | |
| *F24F 11/62* | (2018.01) | |
| *F24F 11/54* | (2018.01) | |
| *F24F 11/59* | (2018.01) | |
| *F24F 11/52* | (2018.01) | |
| *F24F 11/64* | (2018.01) | |

(52) U.S. Cl.
CPC .......... *G05B 19/0426* (2013.01); *F24F 11/52* (2018.01); *F24F 11/54* (2018.01); *F24F 11/59* (2018.01); *F24F 11/62* (2018.01); *F24F 11/64* (2018.01); *G05B 2219/2614* (2013.01)

(58) Field of Classification Search
CPC .. F24F 11/52; F24F 11/54; F24F 11/59; F24F 11/62; F24F 11/64; G05B 19/0426; G05B 2219/2614
See application file for complete search history.

(56) References Cited

U.S. PATENT DOCUMENTS

| 2,054,039 A | 9/1936 | Persons |
|---|---|---|
| 2,060,636 A | 11/1936 | Persons |

(Continued)

FOREIGN PATENT DOCUMENTS

| JP | 58065977 | 4/1983 |
|---|---|---|
| JP | 2004218436 | 8/2004 |
| JP | 2006009596 | 1/2006 |

OTHER PUBLICATIONS

ComfortLink II XL950 Control, User Guide, Trane U.S. Inc., 2011.
(Continued)

*Primary Examiner* — Abdelmoniem I Elamin
(74) *Attorney, Agent, or Firm* — The Law Offices of Konrad Sherinian LLC (57) ABSTRACT

A thermostat update and copying system can include a first thermostat having a processor, a transmitter, a storage area. In some embodiments, the processor generates update data, the storage area maintains the update data, and the transmitter transmits the update data to multiple target devices. In some embodiments, the target devices include mobile devices capable of running applications to receive the update data and/or at least a second thermostat wherein the second thermostat is activated and update data is transmitted by the transceiver to the second thermostat.

13 Claims, 8 Drawing Sheets

(56) References Cited

U.S. PATENT DOCUMENTS

| | | |
|---|---|---|
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitch |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |

(56) References Cited

U.S. PATENT DOCUMENTS

| | | |
|---|---|---|
| 9,201,431 B2 | 12/2015 | Lyle |
| 9,304,676 B2 | 4/2016 | Poplawski |
| 9,714,771 B1* | 7/2017 | Goodman ............... F24F 11/30 |
| 10,001,792 B1* | 6/2018 | Packer .................... G05D 23/32 |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0245352 A1 | 12/2004 | Smith |
| 2004/0256472 A1 | 12/2004 | DeLuca |
| 2004/0260427 A1 | 12/2004 | Wimsatt |
| 2005/0033707 A1 | 2/2005 | Ehlers |
| 2005/0040248 A1 | 2/2005 | Wacker |
| 2005/0040249 A1 | 2/2005 | Wacker |
| 2005/0082836 A1 | 4/2005 | Lagerwey |
| 2005/0108620 A1 | 5/2005 | Allyn et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman, Jr. et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0032414 A1 | 2/2013 | Yilmaz |
| 2013/0056989 A1 | 3/2013 | Sabhapathy |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0152631 A1 | 6/2014 | Moore et al. |
| 2014/0156087 A1* | 6/2014 | Amundson ............ G05B 15/02 700/278 |
| 2014/0163746 A1 | 6/2014 | Drew |
| 2014/0316581 A1 | 10/2014 | Fadell |
| 2014/0319233 A1 | 10/2014 | Novotny |
| 2015/0081568 A1 | 3/2015 | Land, III |
| 2015/0167995 A1 | 6/2015 | Fadell |
| 2015/0233595 A1 | 8/2015 | Fadell |
| 2015/0280935 A1 | 10/2015 | Poplawski et al. |
| 2016/0040903 A1* | 2/2016 | Emmons ............. H04L 67/1078 700/278 |
| 2016/0062618 A1 | 3/2016 | Fagan |
| 2016/0124828 A1 | 5/2016 | Moore et al. |
| 2016/0131385 A1* | 5/2016 | Poplawski .............. H04W 4/20 700/278 |
| 2016/0154576 A1 | 6/2016 | Moore et al. |
| 2016/0165663 A1* | 6/2016 | Shanmugam ......... H04W 76/10 370/338 |
| 2016/0233710 A1* | 8/2016 | Hong .................... G06F 13/385 |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |
| 2018/0074471 A1* | 3/2018 | Poplawski ............... F24F 11/30 |

OTHER PUBLICATIONS

CARDIO lie Installer's Guide, System Version 2.5xx, 5th edition, 2008, Secant Home Automation Inc.

What you should know about flexible displays (FAQ); http://news.cnet.com/8301-1035_3-57607171-94/what-you-should-know-about-flexible-d . . . ; Nov. 25, 2013.

Brae8urn Systems LLC, "Temperature Limiting Adjustments for heating and Cooling (1000 Series)", Mportant Installation Instructions.

* cited by examiner

THERMOSTAT UPDATE AND COPY METHODS AND SYSTEMS

CROSS-REFERENCE TO RELATED APPLICATION

This application relates to and claims priority benefits from U.S. Provisional Application No. 62/300,539 entitled "Thermostat Update and Copy System Without Cloud Connection" having a filing date of Feb. 26, 2016. The '539 application is incorporated herein by reference in its entirety.

FIELD OF THE INVENTION

The present disclosure relates to thermostat update systems for transmitting update data between thermostats, remote devices, and/or the cloud.

BACKGROUND OF THE INVENTION

The adjustment and setting of thermostats and the programming that exists with such thermostats determines how HVAC equipment is modulated and for what duration the equipment should run. Many thermostats have complex and confusing controls requiring a great deal of time to program. Individuals who receive new thermostats often have difficulty navigating the complexities of thermostat settings.

Furthermore, in buildings with multiple units, there are often multiple thermostats that require programming. In situations where installers must manually program each thermostat, setting up the thermostats can take a significant amount of time and there is a high likelihood that mistakes will be made.

What is needed is a thermostat update system that circumvents such difficulties by allowing for updated data to be quickly and accurately transferred from one thermostat to another, either directly or through a series of intermediary devices.

SUMMARY OF THE INVENTION

In some embodiments, a thermostat update system can comprise a first thermostat. In certain embodiments, the first thermostat can comprise a processor configured to generate an update datum; a transmitter configured to transmit the update datum to a target device; and/or a storage area configured to store the update datum.

In some embodiments, the target device is a remote device selected from the group consisting of a smartphone, a laptop, a tablet, and a personal computer.

In certain embodiments, the target device is a second thermostat. In some embodiments, the remote device is configured to copy the update datum from the first thermostat. In certain embodiments, the second thermostat can include, among other things, a touch pad and/or a display.

In some embodiments of the thermostat update system, activating a control sequence of the remote device enables transmission of the update datum to a third thermostat. In certain embodiments, the second thermostat is configured to transmit the update datum to the third thermostat. In some embodiments, the update data is transmitted to a Wi-Fi router and the Wi-Fi router transmits the update datum to the second thermostat.

In some embodiments, a thermostat update system can include, among other things, a first thermostat. In some embodiments, the first thermostat can include, among other things, a processor configured to generate an update datum; a transmitter configured to transmit the update datum to a first target device; and/or a storage area configured to maintain the update datum. In certain embodiments, the first target device is a mobile device and the transmitter is configured to transmit the update datum to a second thermostat. In certain embodiments, update datum is transmitted to a Wi-Fi router and the Wi-Fi router transmits the update datum to a second thermostat. In some embodiments, the Wi-Fi router accesses the update datum from a remote server.

In some embodiments, the first thermostat controls a comfort control device. In some embodiments, the second thermostat can include, among other things, a touch pad and/or a mechanical button.

A method of transferring thermostat update data can include, among other things: providing a first thermostat having a processor, a transmitter, and a storage area; generating update data by the processor for the thermostat; maintaining the update data by the storage area; transmitting the update data by the transmitter to multiple target devices, displaying the update data from the first thermostat by the mobile device, activating a control sequence of the mobile device; enabling the transmission of the update data to a third thermostat; transmitting the update data to the third thermostat by the second thermostat; transmitting the update data to a Wi-Fi router wherein the Wi-Fi router is configured to transmit the update data to the second thermostat; and/or accessing the update data from a remote server via the Wi-Fi router.

In some embodiments, the target device can include at least one of a mobile device capable of running an application to receive and store the update data; and a second thermostat configured to receive the update data from the mobile device when a control button is activated.

DETAILED DESCRIPTION OF SOME PREFERRED EMBODIMENTS

The set-up and update of thermostats can be a time consuming and non-intuitive process. For example, in a multi-unit dwelling with dozens to hundreds of similar thermostats, the opportunity for error during the configuration process multiplies quickly. Therefore, it can be desirable for an installing contractor to configure one thermostat and copy the correct update to a plurality, if not all, of the remaining thermostats. In some embodiments, it can also be desirable to update a plurality, if not all, of the thermostats to the latest software version.

Wi-Fi connectable thermostat "thermostat" is used to refer to a comfort control device. In addition to a traditional thermostat, the control device could be, among other things, a humidistat or ventilation controller.

In some embodiments, a thermostat can include a transceiver. In some of these embodiments, a thermostat can broadcast a signal, and in certain embodiments the signal is a Wi-Fi signal detectable by transceivers in Wi-Fi enabled devices.

Traditionally when Wi-Fi thermostats are first connected to the internet, the thermostat is placed in AP (Access Point) mode (wherein the thermostat broadcasts a signal detectable by a Wi-Fi device) and a Wi-Fi password is transferred to the thermostat from a tablet, computer, smartphone, or other Wi-Fi enabled device. The thermostat then tries available networks (often in order of decreasing signal strength) to attempt to gain a successful connection to the internet. This process is outlined in U.S. patent application Ser. No. 14/920,188, which is incorporated herein by reference.

In some embodiments in which each thermostat is not directly connected to the internet, information can be transferred from one AP (access point) connected thermostat to other thermostats in a thermostat network. The copy or update function can take place at the installation site, while still at the installing contractors facility, during the manufacturing process, or somewhere else along the process from manufacture to installation.

A thermostat update system can comprise, among other things, a Wi-Fi connectible thermostat, a processor, a transmitter, and a storage area. In some embodiments, the transmitter can transmit update data to multiple target devices, which can include, but are not limited to, mobile devices having applications configured to receive the update data or fixed devices which can be activated.

A thermostat update system can comprise, among other things, a first thermostat having a processor, a transceiver and a storage area. In some embodiments, the processor generates update data for the thermostat and the storage area maintains the update data. In some embodiments, the transmitter can transmit update data to multiple target devices, including at least one mobile device capable of running an application to receive update data and memory, as well as a second thermostat. A control button on at least one thermostat can be activated in order to transmit update data to the mobile device and/or additional thermostats. In some embodiments, the mobile device is capable of displaying the update data from the first thermostat. In some embodiments, the first thermostat can include at least one of a stand-alone thermostat and a thermostat combined with other components providing environmental controls for a building.

In some embodiments, a touch pad and/or built in contact mouse is provided by a display of the first thermostat in order to transmit the update data. In some embodiments, activating the remote device of the first thermostat enables transmission of the update data to a third thermostat. In some embodiments, the second thermostat is capable of transmitting the update data to a third thermostat. In some embodiments, the update data is transmitted to a Wi-Fi router and the Wi-Fi router sends the update data to the second thermostat.

Example uses of the thermostat update systems and methods provided are provided below.

When constructing single and multi-family dwellings, a builder usually installs a Wi-Fi thermostat with heating and cooling equipment prior to the resident moving in. Often a dwelling sits vacant while units are finished, rented and/or sold. After the resident moves in, the Wi-Fi thermostat can be registered and connected when the resident contracts with an internet provider and internet access equipment is activated. In such instances, it is beneficial to have a thermostat with update and copy capability before the dwelling has internet access available. This capability can be made available by sending non-registration update information from a web server, such as the BlueLink® Smart Data server, to an internet connected smartphone, computer, and/or tablet, to an AP (Access Point) enabled thermostat. Copy information can be sent from copy source AP enabled thermostat to the smart phone then to the copy target AP enabled thermostat. In some embodiments, the copy information can be send from copy source AP enabled thermostat directly to copy target AP enabled thermostat.

While the above example is directed towards dwellings for purchase and later occupation by individuals, there are also a variety of reasons why a thermostat system would not be updated when installed, including: transitionally available internet access such as mobile hotspots, and local, state or federal laws and regulations that may prohibit unattended active radio devices.

Figure 10:
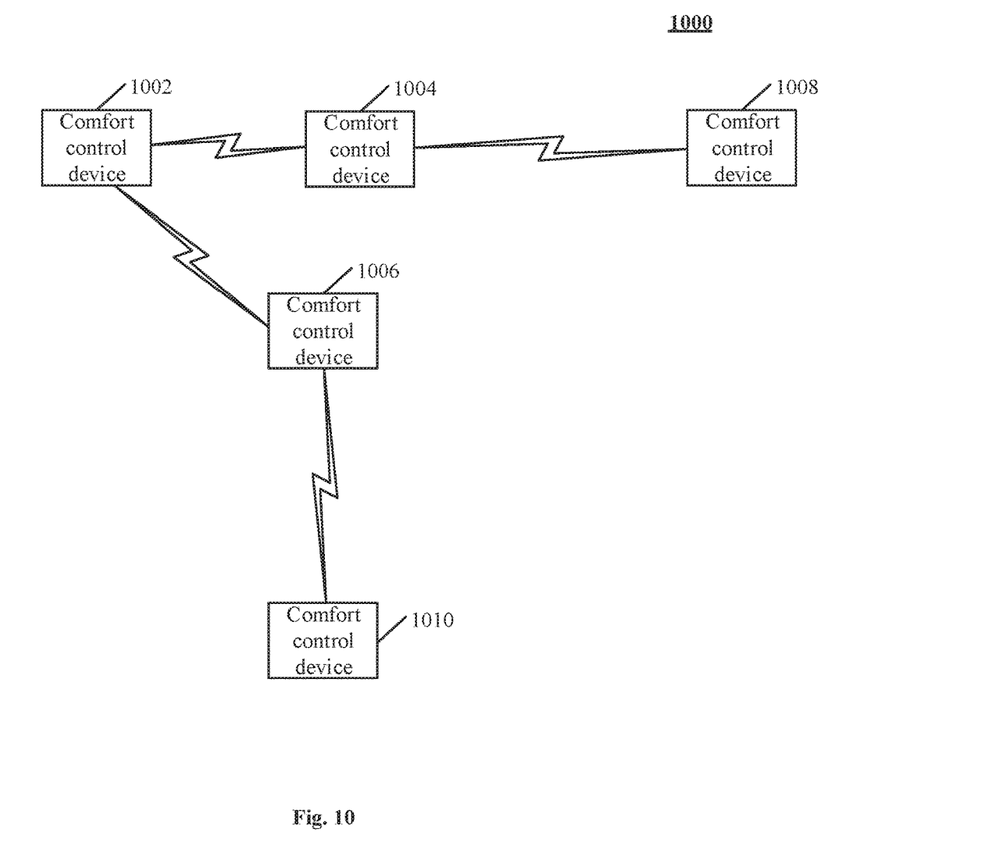
FIG. 10 is an illustrative block diagram of thermostats in a thermostat update and copy system in accordance with the present teachings.

In at least some embodiments, a thermostat update and copy system operates by transmitting data over ad-hoc wireless networks. In certain embodiments, these networks are short wavelength radio wave networks, such as Bluetooth networks. In ad-hoc embodiments, a transceiver on a first thermostat can connect directly to transceivers on other devices. These other devices need not be connected directly to the internet, or to other wireless networks. In at least some embodiments, the ad-hoc thermostat network is capable of transmitting authentication information for wireless networks from a single device having such credentials (such as a mobile device, server, wireless router, or computer) to other thermostats within the network. Illustrative thermostats in the thermostat update and copy system are further illustrated in FIG. 10 and indicated at 1002, 1004, 1006, 1008 and 1010.

Figure 11:
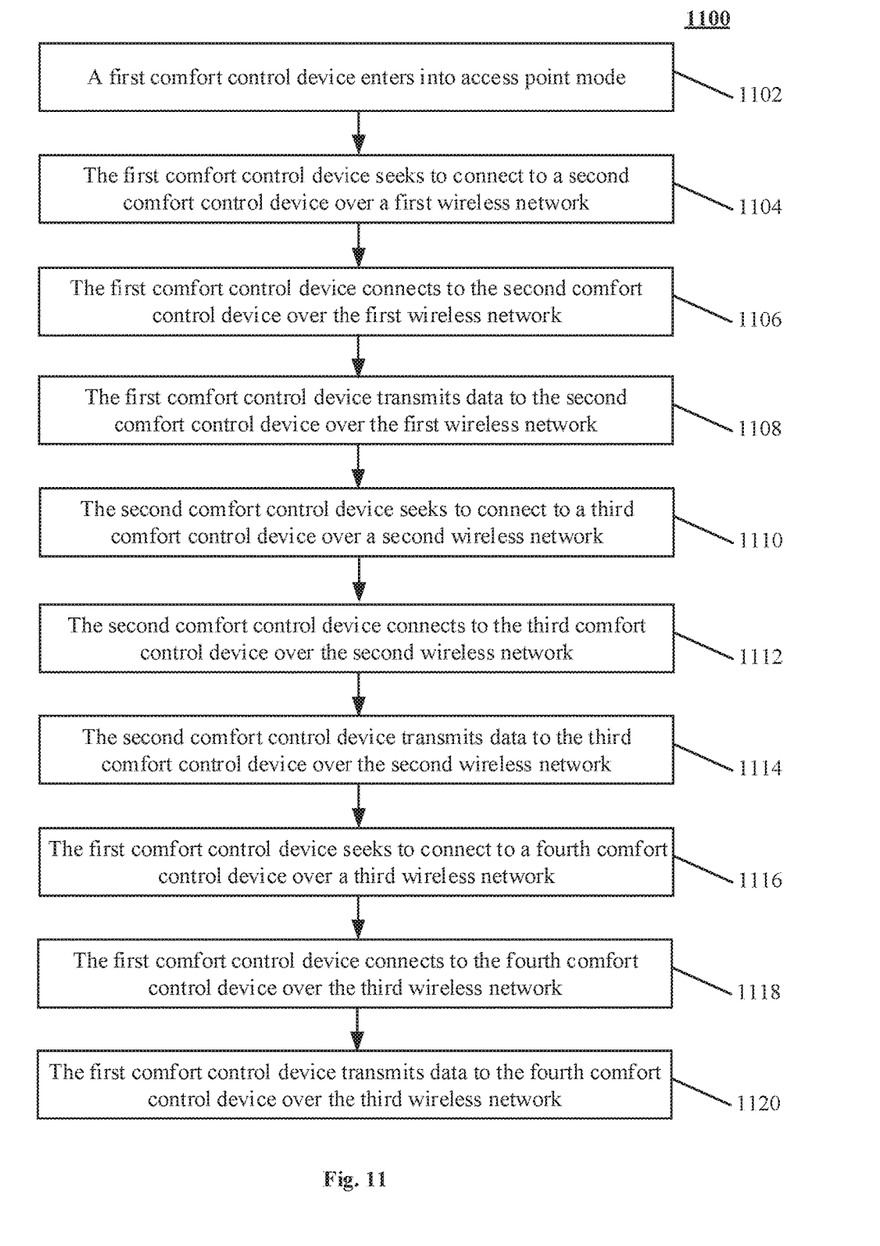
FIG. 11 is an illustrative flowchart diagram illustrating self-developing connections in an ad-hoc network and data transmission in accordance with the present teachings.

In some embodiments, the ad-hoc network can be self-developing, wherein a first device in the network need not be in range of an internet access point. Instead, when the thermostat enters AP mode, it can seek other thermostats and devices to connect to. In some embodiments, the thermostat will connect to other AP enabled thermostats automatically. Each of the thermostats in this network can then connect to other thermostats and devices, until one such thermostat or device has access to a Wi-Fi or hardline enabled internet connection. The device which acquires this connection can receive authentication to access the internet, and then proceed with an updating sequence. This update can then be spread throughout the ad-hoc network to other AP enabled thermostats. This type of networking has several advantages, namely that the thermostat to initiate the update sequence need not be within range of a wireless network. This is particularly helpful for large networks of thermostats, wherein an installer can be unsure as to which thermostat has the best connection opportunity to proceed with an update sequence. The self-developing connections in the ad-hoc network and data transmission are further illustrated in FIG. 11 and indicated at 1102

In an ad-hoc thermostat network, the thermostat having the strongest connection to the internet can be selected automatically to proceed with the update procedure. Once the update is acquired, the update can spread to other thermostats and devices within the network.

In some embodiments, and ad-hoc thermostat network is capable of self-developing, wherein each thermostat will automatically connect to other thermostats in the area. In some embodiments, this network is pre-determined. For instance, a manufacturer, contractor, or individual maintaining the thermostat network can specify which units are to be part of the network. In some embodiments, a user can specify a host thermostat having a Wi-Fi connection, from which updates will disseminate. In other embodiments, a user can instruct a thermostat network to self-determine the thermostat of best connection for each update. In certain embodiments, the update sequence for a thermostat network can be controlled from a third-party device, such as a mobile device with wireless capability. In other embodiments, the update sequence can be controlled from a specific thermostat, or from any thermostat in the network.

In some embodiments, each thermostat in a network will have at least one hard button and/or at least one soft button. In some embodiments, a thermostat can have a network access port, such as a CAT-5 port. In embodiments comprising ad-hoc thermostat networks, a thermostat with a CAT-5 connection or similar wired internet connection can be specified as the update host thermostat.

In some embodiments, a network of thermostats can be monitored and configured using software on a device which can be connected to the thermostat network when in range, such as a smartphone. In other embodiments, a thermostat network can be configured using an on site or off site device in internet communication with at least one thermostat in a thermostat network.

In some embodiments, the networked device in communication with the greatest channel capacity is used as a host device. In at least some embodiments, channel capacity is defined according to Shannon's formula, given as:

$$C = B\left(\log_x\left(1 + \frac{S}{N}\right)\right)$$

wherein C is the channel capacity, B is the bandwidth, S is the signal, N is the noise, and in some embodiments x is equal to 2. In other embodiments, host determination can involve quantities from Hartley's law, the Nyquist rate, or other calculated or measured quantities known in information or data transmission theory. In other embodiments, expanded versions of Shannon's formula can be used. In some embodiments, an ad-hoc network is developed to minimize the path attenuation between thermostats. In some embodiments, each thermostat has an individual IP address, and in some embodiments this address is known by devices connected to the thermostat network. In some embodiments, a network of thermostats can be configured to automatically receive updates.

In some embodiments, a thermostat network can be configured to update when temperatures surrounding the thermostats in the network are at their lowest in a specified period of time, to maximize network performance and data transfer rates. In other or the same embodiments, updates can occur at times specified by a user on at least one device connected to a thermostat network.

In some embodiments, all thermostats default to being in AP mode. In at least some of such embodiments, AP mode thermostats are programmed to seek connections with other AP mode thermostats. In at least some of such embodiments, AP mode thermostats are configured to seek connections with wireless communication enabled devices. In certain embodiments, thermostats will seek connections to other thermostats with a higher priority than connections to other devices, and will then seek connections with other devices once a stable network of thermostat connections has been established. In some embodiments, a user can leave a thermostat network open, allowing authorized devices to access the network at any time. In other or the same embodiments, a user can close a network to non-authenticated devices.

In certain embodiments, a user is able to specify the particular thermostat units in a given thermostat network.

In some embodiments, each thermostat in a thermostat network has unique authentication credentials. In some of such embodiments these credentials can be stored on storage devices provided within thermostats. In other or the same embodiments, a master list of authenticated thermostats can be stored on a remote device, such as a server. In such embodiments, a user can access and modify this list using devices in communication with said storage device, such as mobile devices or computers. In other or the same embodiments, all properties for a thermostat network can be configured from a single thermostat in the network.

Some embodiments of the system and method disclosed are shown in FIGS. 1-8. In some embodiments, the thermostat update system enables thermostat configuration and programming data to be copied from a source thermostat to at least one target. In some embodiments, the thermostat update system allows thermostat firmware update data to be transferred through a smartphone to another thermostat. This firmware can, among other things, reside as part of an app, be downloaded from a webserver, and/or contained on a device connected to the thermostat update system via a wired or wireless connection.

Figure 1:
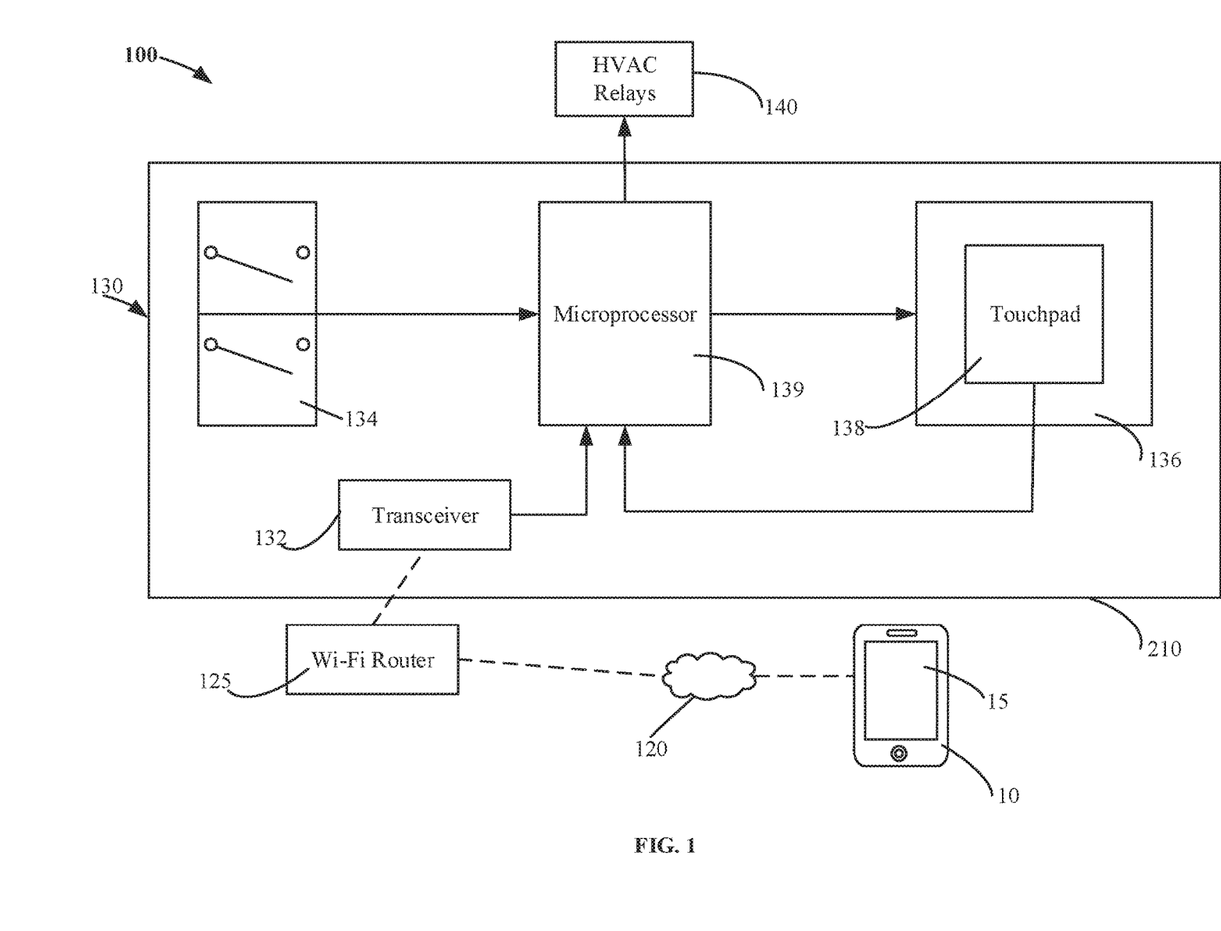
FIG. 1 is a diagrammatic view of a thermostat update system.

Turning to FIG. 1, thermostat update system 100 includes remote device 110. In some embodiments, remote device 110 is a smartphone or tablet that includes screen 115. In some embodiments, screen 115 can be used as both a display and an input device for thermostat update system 100. In some embodiments, input can be via a qwerty key pad that is displayed on screen 115 and/or via other means such as a mouse or attached keyboard (not shown). Remote device 110 can include telecommunications standard transmission means such as 4G transmission or Wi-Fi transmission via internet 120.

In some embodiments, remote device 110 transmits to Wi-Fi router 125 within a building where the targeted thermostat is located. Wi-Fi router 125 can communicate with transceiver 132 located within thermostat 130 (see FIG. 8). Thermostat 130 can include, among other things, on/off switches 134, display 136, touchpad 138 and microprocessor 139. Thermostat 130 can control HVAC system 140 and/or other climate control system(s).

In some embodiments, such as the one illustrated in FIG. 1, microprocessor 139 of thermostat 130 is programmed to transmit data regarding the operation of thermostat 130 upon user input. In some embodiments, the transmission of the data in is via transceiver 132 and Wi-Fi router 125 to internet 120.

In some embodiments, a cloud server can collect and organize update data being transmitted from thermostat 130. In at least some embodiments, remote device 110 and/or other devices that are linked to internet 120 can obtain the update data from cloud server. The update data can be stored in physical memory. The physical memory can be located, among other places, in thermostat 130, Wi-Fi router 125, or other devices connected to thermostat update system 100. In some embodiments, a request for the update data can be processed by microprocessor 139 by sending the update data directly to requesting remote device 110 or another thermostat (without use of a cloud server).

Figure 2:
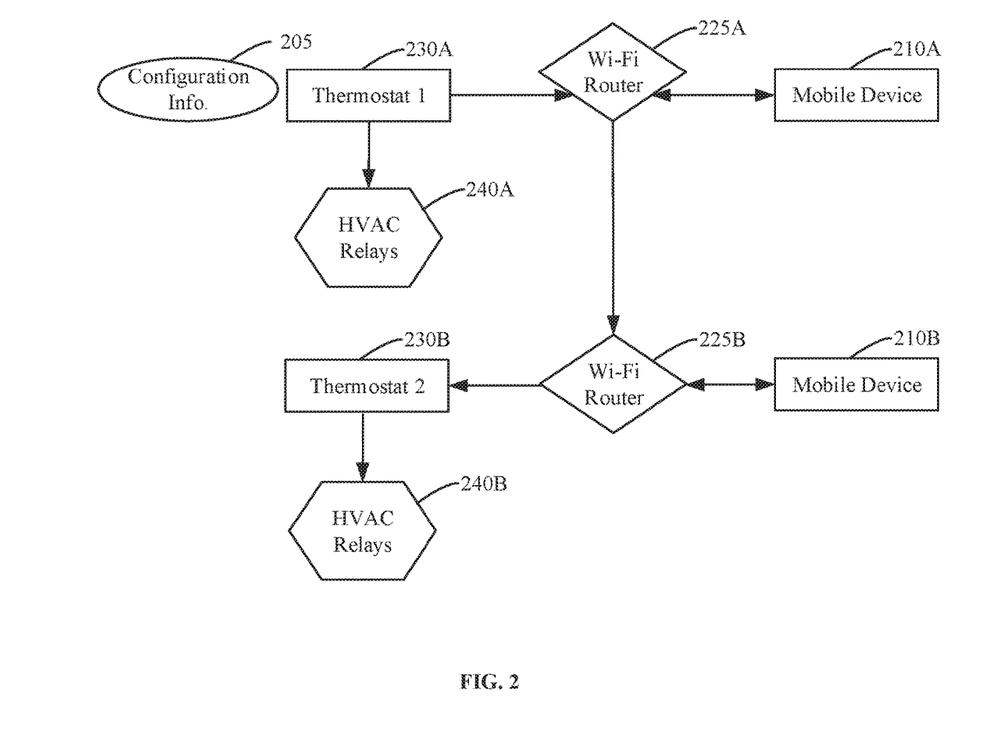
FIG. 2 is a schematic diagram of a thermostat update system.

FIG. 2 depicts a schematic diagram providing an overview of a potential paths for data transmission. The embodiment show in FIG. 2 provides for the transmission of update data 205 to and/or from first thermostat 230A to and/or from first remote device 210A, second remote device 210B, and/or second thermostat 230B.

In some embodiments, first thermostat 230A is programmed to set the update data. Update data can include mode and function settings of thermostat 230A, including, but not limited to, temperature setting(s), time of day setting(s), day of week setting(s), programming set point(s), installer setting update(s), user setting(s), device identification information, Wi-Fi router interface data, Wi-Fi router identification data, mobile device identification data, source(s) of input(s) for temperature, source(s) of input(s) for relative humidity, discharge temperature, outdoor temperature, stages present, cooling response, lock-out, set point degrees, auxiliary stages, heat response, scheduling data, energy management setting(s), recovery setting(s), uploader and downloader update setting(s), internet communication setting(s), configuration data, and/or other relevant data to the operation of a thermostat update system such as thermostat update system 100. Update data can be programmed directly at first thermostat 230A and/or remotely, such as by remote device 210A and/or remote device 210B. Remote devices 210A and 210B can be, among other things, smartphones, tablets, computers, and/or laptops.

Once first thermostat 230A is configured it operates HVAC control relays 240A to manage the environment of the building. In some embodiments, control button 854 ("CONFIG") (see FIG. 8) on first thermostat 230A can be activated to transmit update data 205 to Wi-Fi router 225A. In some embodiments, Wi-Fi router 225A can transmit update data 205 to remote device 210A, remote device 210B and/or Wi-Fi router 225B. Update data 205 can then be transmitted to second thermostat 230B.

In some embodiments, second thermostat 230B can be located in a second building adjacent to a first building housing first thermostat 230A. In some embodiments, a plurality of thermostats is in a single building/complex. In such environments, first thermostat 230A can transmit update data 205 to each of thermostat in the building via a process similar to that discussed above in regard to second thermostat 230B. As shown in FIG. 2, first thermostat 230A is the source for update data 205 and second thermostat 230B is the target.

In some embodiments, second thermostat 230B can become the new source of update data 205 and a third thermostat (not shown) can become the target. In such an example, second thermostat 230B can transmit update data 205 to the third thermostat (not shown). Remote devices 210A and 210B can be used to supplement the operation and/or can be used to alter update data 205 and/or update settings of a plurality of the thermostats. In some embodiments, once a target thermostat receives update data 205, it is then capable of controlling the environment via a corresponding HVAC control relay.

Figure 3:
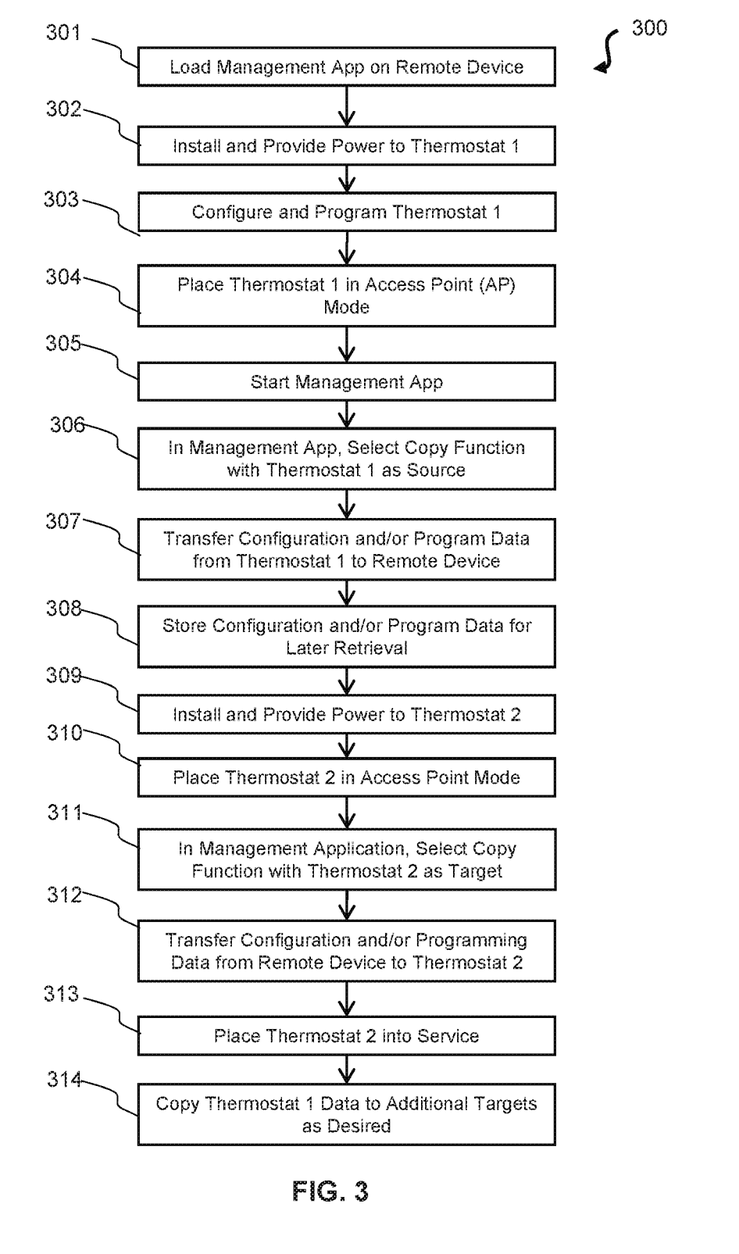
FIGS. 3 and 4 are flow diagrams of procedures and methods of use of thermostat update systems.
Figure 4:
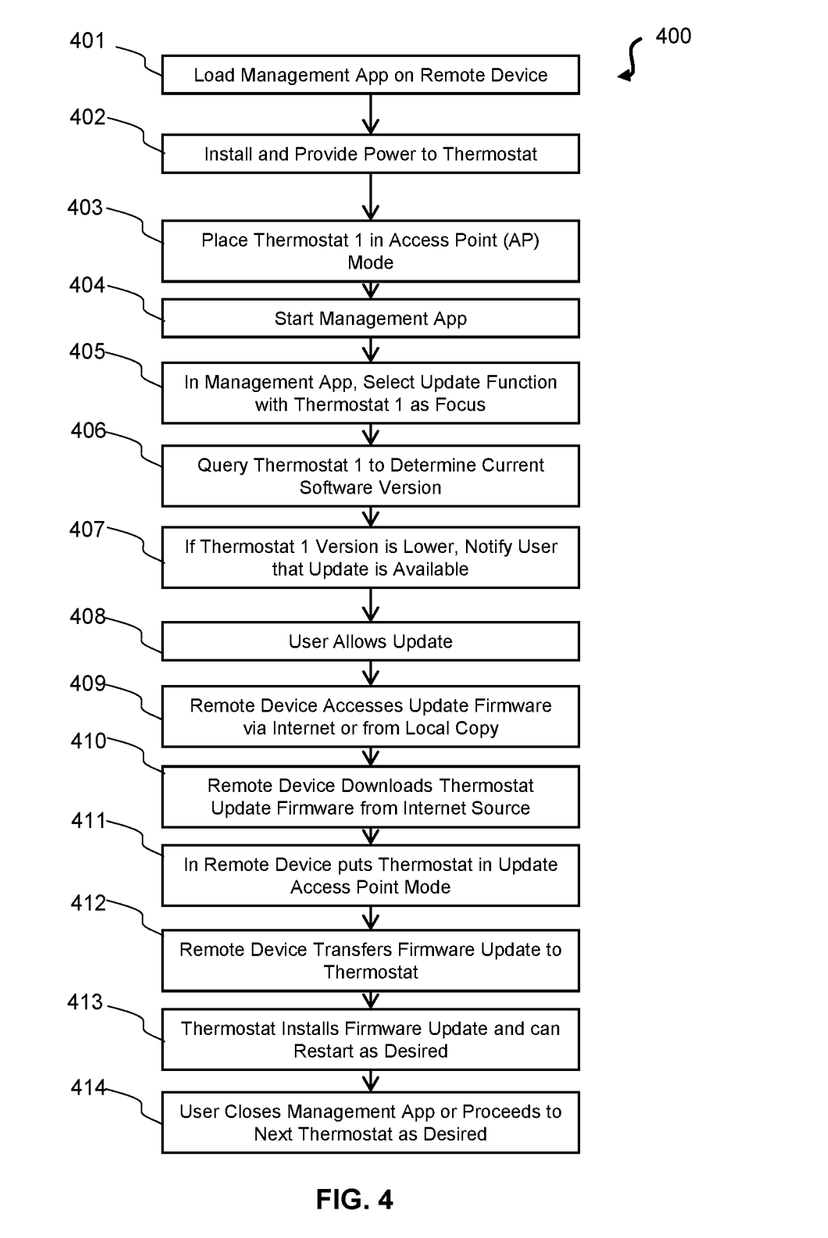

FIGS. 3 and 4 illustrate examples of thermostat update and programming data being copied from a source thermostat and transferred to a target. As is true throughout the entire application, unless otherwise specified or necessitated by logic, the various methods are not limited to the order in which the steps are described.

Method 300 can provide an AP copy to facilitate data transfer directly from the remote device to the thermostat without the need for a working Wi-Fi connection.

At 301, a Management App is downloaded to a remote device, such as a smartphone or tablet. At 302, a first thermostat (Thermostat 1) is installed and provided with power. At 303, Thermostat 1 is configured and programmed for the installation. At 304 Thermostat 1 is placed in AP (access point) mode.

At 305, Management App (MApp) is started. In some embodiments, Management App includes a user login process. At 306, a user selects a copy function and selects Thermostat 1 as the source from which material is to be copied. In some embodiments, 306 is accomplished using Mapp. At 307, update and/or programming data is transferred from Thermostat 1 to a remote device such as a smartphone via AP communication. At 308, update and/or programming data are stored for later retrieval.

At 309, the user installs a second thermostat (Thermostat 2) and provides power to Thermostat 2. At 310, Thermostat 2 is placed into AP mode. At 311, a user selects a copy function and selects Thermostat 2 as the copy target. In some embodiments, 311 is accomplished using MApp. At 312, update and/or programming data is/are transferred from a remote device, such as a smartphone to Thermostat 2 via AP communication. At 313, Thermostat 2 is placed into service. In some embodiments, at 314 thermostat firmware update data can be transferred through the remote device such as a smartphone to the thermostat or additional targets when appropriate.

Turning to FIG. 4, AP update process 400 is described according to some embodiments. At 401, a Management App is downloaded to a remote device such as a smartphone or tablet. At 402, a first thermostat (Thermostat 1) is installed, provided with power, and configured/programmed. At 403, Thermostat 1 is placed in AP (access point) mode. At 404, Management App (MApp) is started. In some embodiments, MApp includes a user login process. At 405, user selects an update function and selects Thermostat 1 as the update target. In some embodiments, 405 is accomplished using Mapp. At 406, Thermostat 1 is queried to determine whether its software is the most current version.

In some embodiments, at 407 the MApp determines that Thermostat 1 does not have the latest firmware update (in FIG. 4 the firmware version is a lower/previous version). At 408, MApp notifies a user that an updated version of the firmware is available and obtains permission from the user to update. At 409, the App retrieves model specific firmware from the cloud and/or internet. At 410, the remote device downloads the updated firmware from an internet source. In some embodiments, the firmware is downloaded via a LTE or Wi-Fi connection.

At 411, the remote device puts Thermostat 1 in updated AP mode. At 412, the updated firmware is transferred to Thermostat 1 from smartphone via AP communication. At 413, Thermostat linstalls firmware updates. In some embodiments, Thermostat 1 restarts as part of the update process at 413. At 414, the user closes the MApp and/or proceeds to the next thermostat for updating where appropriate.

Figure 5:
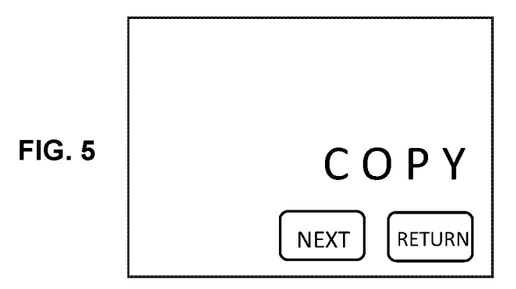
FIG. 5 is a screen shot of a copy menu indicating that copying has been initiated.

Turning to the example screen shots, FIGS. 5-8, the target thermostat displays the word "Copy" as shown in FIG. 5.

Figure 6:
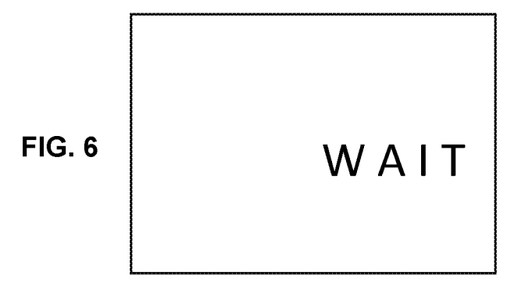
FIG. 6 is a screen shot of a wait menu indicating that the copying process is underway.
Figure 7:
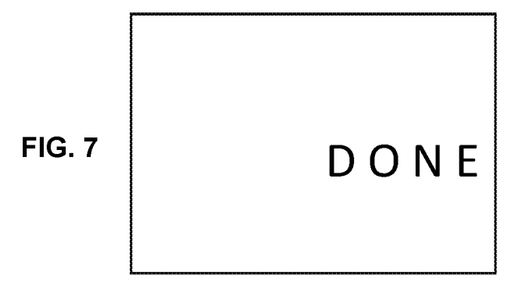
FIG. 7 is a screen shot of a done menu indicating that the copying process has completed.
Figure 8:
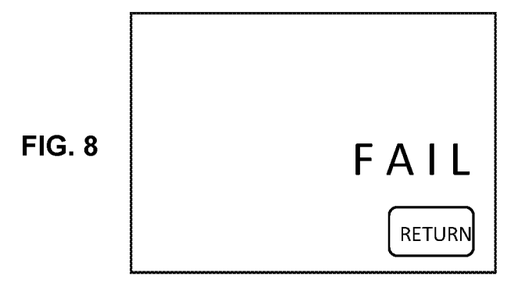
FIG. 8 is a screen shot of a fail menu indicating a failed step.

The step can also include the "Next" and "Return" buttons also being displayed. The following step, has the installer pressing the "Next" button at the target to help ensure the user has selected the correct target thermostat and start the copying function. The target thermostat displays a "Wait" alphanumeric display as shown in FIG. 6. The target thermostat retrieves the source configuration from the remote device, cloud, or via Wi-Fi router 320 (FIG. 2). The target thermostat 310 loads the source configuration into the target thermostat non-volatile memory or another storage location. The target thermostat 310 displays the alphanumeric symbol for "DONE" as depicted in FIG. 7. In the event that the configuration data fails to load to the target device, the display would provide a "FAIL" message (FIG. 8) and appropriate diagnostic codes to facilitate troubleshooting error messages.

Figure 9:
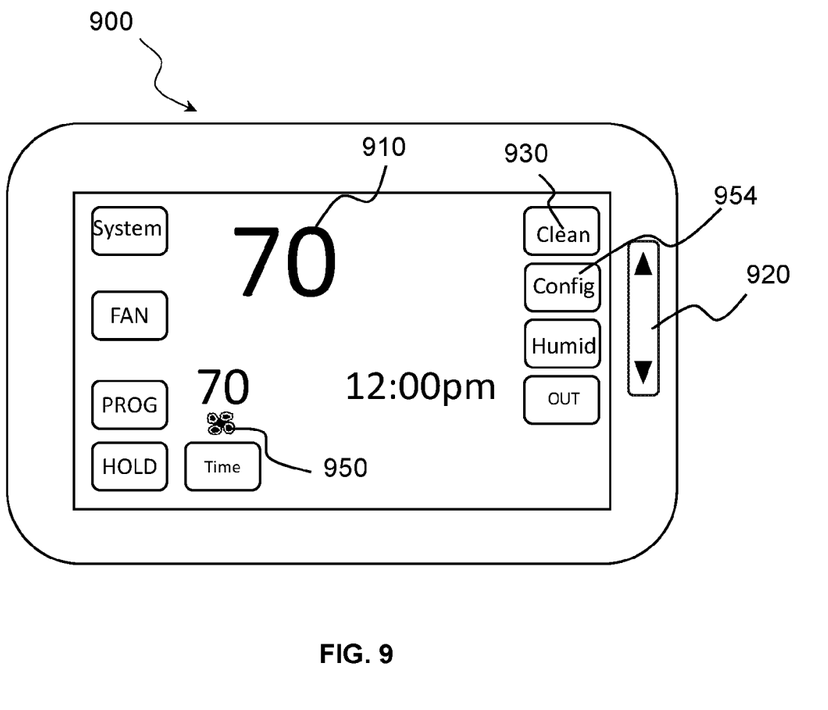
FIG. 9 is a plan view of a thermostat configured to be used with a thermostat update system.

FIG. 9 depicts a first embodiment of thermostat 900 configured to be used in a thermostat update system such as the one depicted in FIG. 1. In some embodiments, thermostat 900 can include control buttons such as update touch pad 954 and/or hard button 920. The control button(s) can be used to transmit update data to another device as discussed above. Other features of thermostat 900 can include Temperature Icon 910, alternative touch pads 930, for functions such as CLEAN, HUMIDITY, OUTDOOR, SYSTEM, FAN PROG, HOLD DAY/TIME and fan icon 940. The thermostat can be similarly constructed with only control buttons, control buttons and a touch screen, or only a touch screen.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A comfort control device comprising:
(i) a processor;
(ii) a transceiver connected to said processor;
(iii) a storage area configured to store a datum;
(iv) said comfort control device adapted to enter an access point mode;
(v) said comfort control device adapted to seek connection to a second comfort control device over a first wireless network via said transceiver when said comfort control device is in said access point mode;
(vi) said comfort control device adapted to connect to said second comfort control device over said first wireless network via said transceiver; and
(vii) said comfort control device adapted to transmit said datum to said second comfort control device over said first wireless network via said transceiver, wherein:

(a) said second comfort control device is adapted to seek connection to a third comfort control device over a second wireless network;
(b) said second comfort control device is adapted to connect to said third comfort control device over said second wireless network: and
(c) said second comfort control device is adapted to transmit said datum to said third comfort control device over said second first wireless network.

2. The comfort control device of claim 1 wherein said first wireless network and said second wireless network are short wavelength radio wave networks.

3. The comfort control device of claim 2 wherein said short wavelength radio wave networks are Bluetooth networks.

4. The comfort control device of claim 1 wherein said datum is an authentication datum for accessing the Internet.

5. The comfort control device of claim 1 wherein said comfort control device and said third comfort control device cannot access a same Wi-Fi network.

6. The comfort control device of claim 1 wherein said comfort control device, said second comfort control device and said third comfort control device are thermostats.

7. The comfort control device of claim 1 wherein said comfort control device, said second comfort control device and said third comfort control device are Wi-Fi enabled thermostats.

8. The comfort control device of claim 1 wherein said comfort control device is further adapted to:
(d) seek connection to a fourth comfort control device over a third wireless network via said transceiver when said comfort control device is in said access point mode;
(e) connect to said fourth comfort control device over said third wireless network via said transceiver; and
(f) transmit said datum to said fourth comfort control device over said third wireless network via said transceiver.

9. The comfort control device of claim 8 wherein said third wireless network is a short wavelength radio wave network.

10. The comfort control device of claim 9 wherein said short wavelength radio wave network is a Bluetooth network.

11. The comfort control device of claim 8 wherein said datum is an authentication datum for accessing the Internet.

12. The comfort control device of claim 8 wherein said fourth comfort control device is a thermostat.

13. The comfort control device of claim 12 wherein said fourth comfort control device is a Wi-Fi enabled thermostat.

* * * * *